US011020855B2

(12) United States Patent
Nakayama et al.

(10) Patent No.: US 11,020,855 B2
(45) Date of Patent: Jun. 1, 2021

(54) STORAGE DEVICE, MOBILE ROBOT, STORAGE METHOD, AND STORAGE PROGRAM

(71) Applicant: TOYOTA JIDOSHA KABUSHIKI KAISHA, Toyota (JP)

(72) Inventors: Takahiro Nakayama, Nagoya (JP); Kazuhiro Mima, Toyota (JP); Hiroshi Bito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 15/841,748

(22) Filed: Dec. 14, 2017

(65) Prior Publication Data

US 2018/0215042 A1 Aug. 2, 2018

(30) Foreign Application Priority Data

Feb. 1, 2017 (JP) .............................. JP2017-016761

(51) Int. Cl.
  *G06F 3/06* (2006.01)
  *B25J 9/16* (2006.01)
  *G01D 5/347* (2006.01)
  *B25J 5/00* (2006.01)
  *G06F 16/00* (2019.01)
  (Continued)

(52) U.S. Cl.
  CPC ............ *B25J 9/1694* (2013.01); *B25J 5/007* (2013.01); *G01D 5/3473* (2013.01); *G06F 3/0608* (2013.01); *G06F 3/0631* (2013.01); *G06F 3/0683* (2013.01); *G06F 16/00* (2019.01); *G01D 9/02* (2013.01); *G06F 12/0246* (2013.01)

(58) Field of Classification Search
  CPC .... G06F 16/00; G06F 12/0246; B25J 9/1694; B25J 5/007; G01D 5/3473; G01D 9/02
  See application file for complete search history.

(56) References Cited

U.S. PATENT DOCUMENTS 6,324,450 B1 * 11/2001 Iwama .................... G07C 5/085
                                                                340/326
6,898,235 B1 *  5/2005 Carlin .................... H04B 1/001
                                                                342/147
(Continued)

FOREIGN PATENT DOCUMENTS

JP    10-309683 A   11/1998
JP    2001-106123 A  4/2001

*Primary Examiner* — Prasith Thammavong
*Assistant Examiner* — Eric T Loonan
(74) *Attorney, Agent, or Firm* — Sughrue Mion, PLLC

(57) ABSTRACT

Provided is a storage device including: a first storage region comprising a plurality of sensor regions for the plurality of the sensors; a second storage region into which a data set is written, the data set being generated by reading, from the respective plurality of sensor regions, sampling data of a sensor having a longest sampling period among the plurality of sensors for one period and sampling data of other sensors for a period corresponding to the period in which the sampling data of the sensor for the one period is generated and integrating the sampling data; and a control unit configured to write the sampling data of the plurality of sensors into the plurality of sensor regions, respectively, in a ring buffer format and generate the data set at a predetermined timing and write the data set into the second storage region in the ring buffer format.

14 Claims, 10 Drawing Sheets

(51) Int. Cl.
   *G06F 12/02*      (2006.01)
   *G01D 9/02*       (2006.01)

(56) References Cited

U.S. PATENT DOCUMENTS

| | | | | |
|---|---|---|---|---|
| 2008/0034170 A1* | 2/2008 | Ohl | ............................ | G06F 5/12 |
| | | | | 711/154 |
| 2011/0295655 A1* | 12/2011 | Tsuji | .................. | G06Q 10/0639 |
| | | | | 705/7.38 |
| 2013/0321167 A1* | 12/2013 | Kohn | ........................ | G06F 5/10 |
| | | | | 340/870.01 |
| 2015/0318015 A1* | 11/2015 | Bose | ...................... | H04N 7/188 |
| | | | | 386/248 |
| 2018/0143939 A1* | 5/2018 | Fu | .................... | G06F 15/17331 |

\* cited by examiner

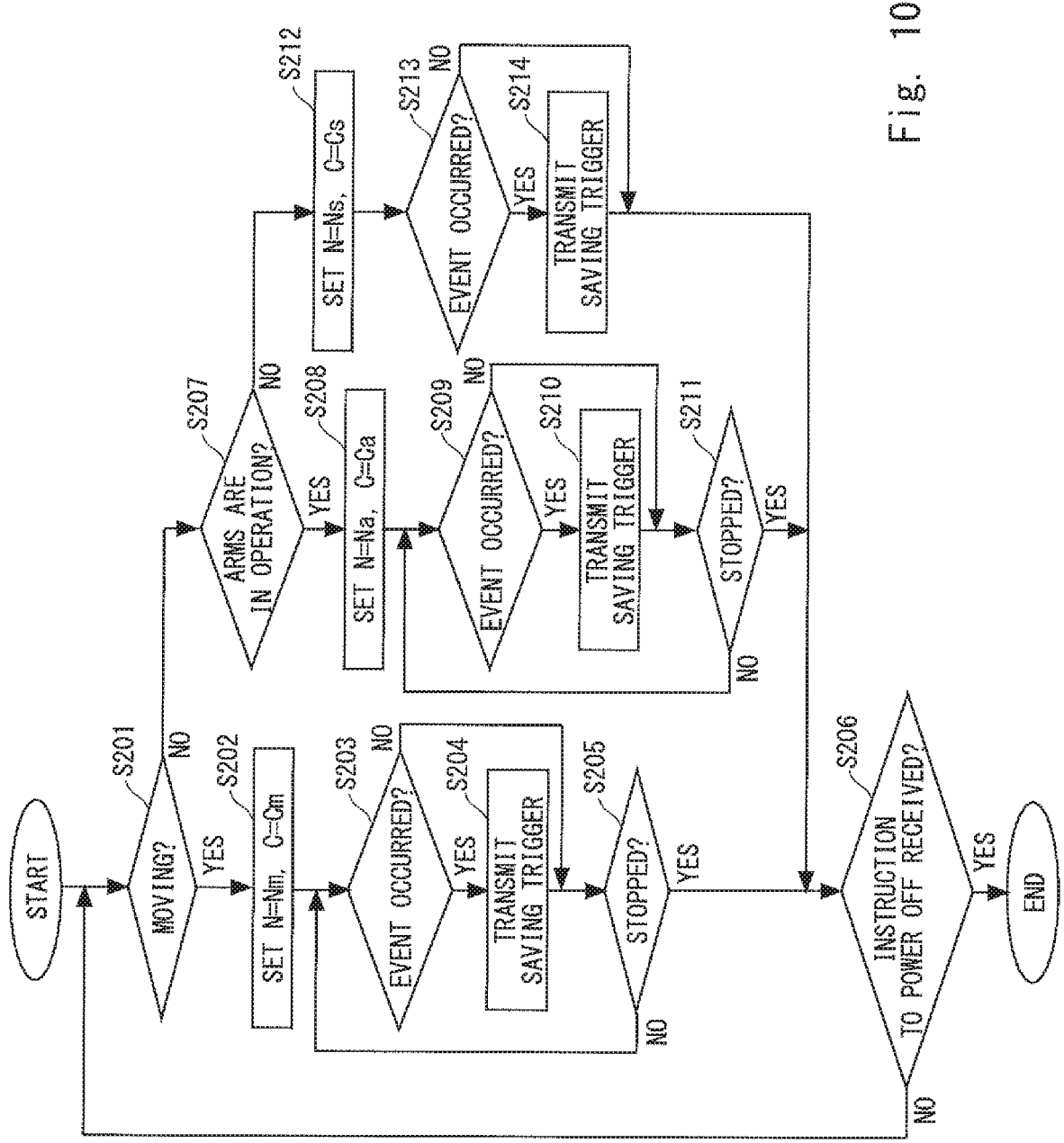

STORAGE DEVICE, MOBILE ROBOT, STORAGE METHOD, AND STORAGE PROGRAM

CROSS REFERENCE TO RELATED APPLICATIONS

This application is based upon and claims the benefit of priority from Japanese patent application No. 2017-016761, filed on Feb. 1, 2017, the disclosure of which is incorporated herein in its entirety by reference.

BACKGROUND

The present disclosure relates to a storage device, a mobile robot, a storage method, and a storage program.

Various sensors are mounted on, for example, a mobile robot capable of moving autonomously. There are demands for recording outputs of these sensors so that movements of the mobile robot can be used for operations later and analyzed. For example, Japanese Unexamined Patent Application Publication No. H10-309683 discloses a robot that does not record outputs of sensors but is configured to store operation waveform data of a plurality of points in a control circuit at predetermined periods in a ring buffer so that the data can be analyzed afterwards.

SUMMARY

Since the sampling period differs from sensor to sensor and the volume of sampling data to be output also differs from sensor to sensor, in order to store outputs from a plurality of sensors of different types, a huge memory will be required if all the outputs are to be stored. It will thus be difficult to know the relations between respective pieces of the sampling data.

The present disclosure has been made to solve such a problem and aims to efficiently obtain the outputs from the plurality of sensors of different types in a log by a compact hardware configuration.

A first aspect of the present disclosure is a storage device for storing sampling data of a plurality of sensors of different types. The storage device includes: a first storage region comprising a plurality of sensor regions for the plurality of the sensors, respectively, a storage capacity into which sampling data for a plurality of periods is written being allocated to each one of the plurality of sensor regions; a second storage region into which a data set is written, the data set being generated by reading, from the respective plurality of sensor regions, sampling data of a sensor having a longest sampling period among the plurality of sensors for one period and sampling data of other sensors for a period corresponding to the period in which the sampling data of the sensor for the one period is generated and integrating the sampling data; and a control unit configured to write the sampling data of the plurality of sensors into the plurality of sensor regions, respectively, in a ring buffer format and generate the data set at a predetermined timing and write the data set into the second storage region in the ring buffer format.

In the storage device configured in a manner described above, a ring buffer for storing the data set, which is integrated sampling data, is provided separately from ring buffers for storing the sampling data of the respective sensors. It is possible to reduce memory capacities of the ring buffers for the respective sensors. Further, since the data set is generated at a desired timing in synchronization with one period of the sensor having the longest sampling period, it is possible to efficiently leave information for constructing a log necessary for analysis afterwards and the like.

As a configuration of the above storage device, in the first storage region, the storage capacity allocated to each of the sensor regions of the sensors other than the sensor having the longest sampling period among the plurality of sensors can be a capacity necessary for storing the sampling data for a period one or more to two or less times the one period of the sensor having the longest sampling period. By configuring the ring buffers for the respective sensors in this way, a memory capacity of the first storage region can be greatly reduced.

Further, the control unit may include tag information in the data set, and the tag information may include time information on a time when the data set is generated. By including the time information in this way, when the data set is used as log information, time management on the data sets will be efficiently carried out.

Moreover, when an instruction signal is received from outside, the control unit may generate the data set and writes the data set into the second storage region. By controlling a timing to generate the data set by the instruction signal in this way, it is possible to change the timing according to a situation and the like of a device on which the storage device is mounted. Furthermore, the control unit may change a period at which the data set generated and written into the second storage region in accordance with an instruction signal received from outside. With such a configuration, it is possible to periodically control the timing to generate the data set by using a timer and also to change the period according to the situation and the like of the device on which the storage device is mounted. If the instruction signal is supplied only when the period is changed in this way, a load on the device on which the storage device is mounted can be reduced.

In addition, the first storage region and the second storage region may be contained in one memory chip. With such a configuration, the memory can be easily implemented, and the footprint of the memory can be reduced. Alternatively, there may be a first memory chip including the first storage region separately from a second memory chip including the second storage region. A data writable speed of the first memory chip may be made greater than a data writable speed of the second memory chip. With such a configuration, performance required for each of the storage regions can be optimally satisfied.

The above storage device further includes a third storage region not overwritten until a reset signal is received. The control unit may be configured to, when it receives a saving signal from outside, copy data sets, the number thereof has been determined in advance, among a plurality of the data sets stored in the second storage region to the third storage region. With such a configuration, in order to leave outputs of the sensors in a log, it is not necessary to access the first storage region, and the data sets can be efficiently transferred to a non-erasing region.

In this case, the control unit may change a part of a region used as the second storage region to the third storage region every time it receives the saving signal. By using a part of the second storage region as the third storage region in this way, the memory can be more efficiently utilized. When the second storage region is deleted and use the deleted part as the third storage region, the control unit may output a warning signal when a storage capacity of the second storage region falls below a capacity for storing the predetermined number of the data sets. By outputting the warning signal in this way, a user can recognize that he or she can no longer obtain the log.

Moreover, the control unit may change at least the number of the data sets to be copied to the third storage region and the data sets to be copied according to the saving signal from outside. With such a configuration, it is possible to flexibly respond to the period of the information necessary in the log, which differs according to the situation of the device on which the storage device is mounted.

A mobile robot on which the plurality of sensors and the storage device are mounted may include a transmission unit configured to transmit the saving signal to the storage device when any one of the plurality of sensors detects a predetermined situation related to movement. Such a configuration allows efficient analysis afterwards of troubles and the like at the time of the movement.

A second aspect of the present disclosure is a storage method for storing sampling data of a plurality of sensors of different types into a storage device. The storage method includes: a first storage step for writing sampling data of the plurality of sensors into a plurality of sensor regions, respectively, in a ring buffer format by using a first storage region of the storage device as the plurality of sensor regions, a storage capacity into which the sampling data for a plurality of periods is written being allocated to each one of the plurality of sensor regions; and a second storage step for generating a data set at a predetermined timing and writing the data set into the second storage region in the ring buffer format by using a second storage region of the storage device as a storage region for writing the data set, the data set being generated by reading, from the respective plurality of sensor regions, sampling data of a sensor having a longest sampling period among the plurality of sensors for one period and sampling data of other sensors for a period corresponding to the period in which the sampling data of the sensor for the one period is generated and integrating the sampling data.

A third aspect of the present disclosure is a storage program for storing sampling data of a plurality of sensors of different types into a storage device. The storage program causes a computer to execute: a first storage step for writing sampling data of the plurality of sensors into a plurality of sensor regions, respectively, in a ring buffer format by using a first storage region of the storage device as the plurality of sensor regions, a storage capacity into which the sampling data for a plurality of periods is written being allocated to each one of the plurality of sensor regions; and a second storage step for generating a data set at a predetermined timing and writing the data set into the second storage region in the ring buffer format by using a second storage region of the storage device as a storage region for writing the data set, the data set being generated by reading, from the respective plurality of sensor regions, sampling data of a sensor having a longest sampling period among the plurality of sensors for one period and sampling data of other sensors for a period corresponding to the period in which the sampling data of the sensor for the one period is generated and integrating the sampling data.

With these aspects of the storage method and the storage program, the same effects as those of the storage device can be expected.

According to the present disclosure, it is possible to efficiently obtain outputs from a plurality of sensors of different types by a compact hardware configuration in a log.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 10 is a flowchart showing a control flow of a mobile robot.

DESCRIPTION OF EMBODIMENTS

Hereinafter, although the present disclosure will be described with reference to embodiments of the invention, the present disclosure according to claims is not limited to the following embodiments. Moreover, all the components described in the following embodiments are not necessarily indispensable for means to solve problems.

Figure 1:
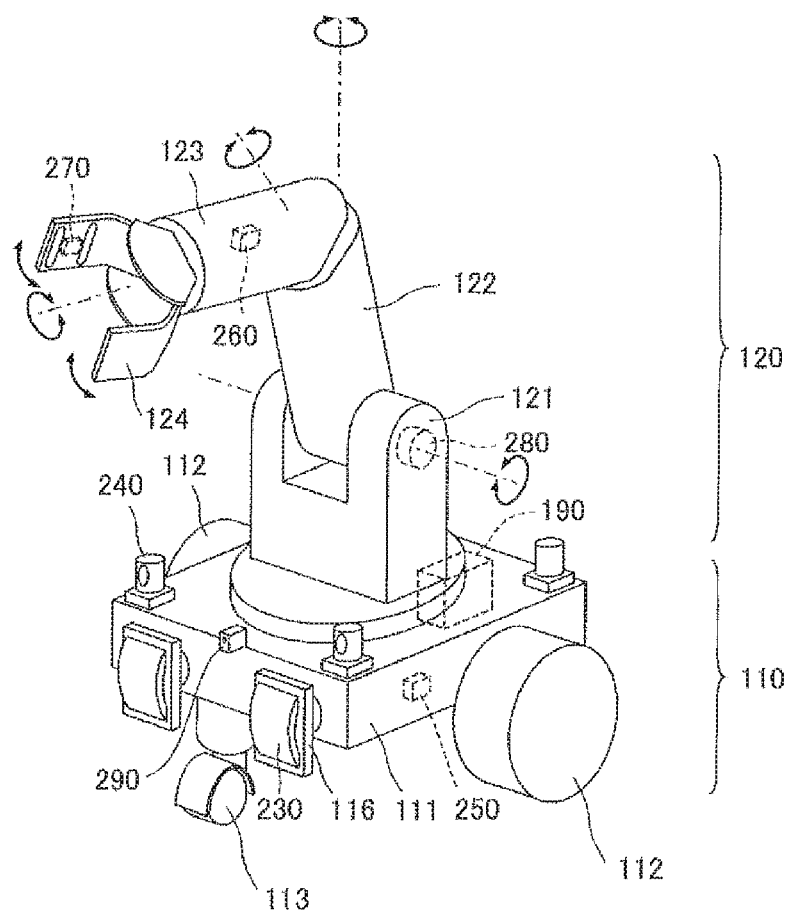
FIG. 1 is an external perspective view of a mobile robot according to the present disclosure.

FIG. 1 is an external perspective view of a mobile robot 10 on which a storage device according to the present disclosure is mounted. The mobile robot 10 is mainly composed of a cart part 110 and a holding part 120.

The cart part 110 is mainly composed of a base 111, two driving wheels 112 attached to the base 111, and one caster 113. The two driving wheels 112 are arranged so that rotational axes thereof coincide on opposite lateral sides of the base 111. Each of the driving wheels 112 is rotated independently by a motor (not shown). The caster 113 is a trailing wheel. The caster 113 is disposed in such a way that a pivot shaft extending from the base 111 in the vertical direction pivotally supports the wheel away from a rotation axis of the wheel. The caster 113 follows the cart part 110 in a direction in which the cart part 110 moves. For example, the mobile robot 10 moves straight if the two driving wheels 112 are rotated at the same rotation speed in the same direction, while it turns around a vertical axis passing through a center of gravity thereof if the two driving wheels 112 are rotated at the same rotation speed in the directions opposite to each other.

Various sensors for detecting obstacles and for recognizing a surrounding environment are provided on the cart part 110. As these sensors, cameras 240 for obtaining surrounding images, an acceleration sensor 250 for detecting acceleration during movement, and a distance sensor 290 for detecting a distance to an obstacle are provided. The cart part 110 includes bumpers 116 for cushioning shock in the event of a collision with an obstacle. Contact sensors 230 for detecting a contact with an obstacle are provided on the respective bumpers 116. A plurality of these sensors are arranged as required.

A control unit 190 is provided in the cart part 110. The control unit 190 includes a system control unit and a storage device which will be described later. Further, sampling data output from each of the above-described sensors is transmitted to the control unit 190.

The holding part 120 is mainly composed of a plurality of arms 121, 122, 123 and a hand 124. One end of the arm 121 is rotatably supported by the base 111 in such a way that the arm 121 is rotatable around the vertical axis. One end of the arm 122 is rotatably supported by the other end of the arm 121 in such a way that the arm 122 is rotatable around a horizontal axis. One end of the arm 123 is rotatably supported by the other end of the arm 122 in such a way that the arm 123 is rotatable in a radial direction at the other end of the arm 122. The hand 124 is rotatably supported by the other end of the arm 123 in such a way that the hand 124 is rotatable around a central axis parallel to a direction in which the arm 123 is extended.

The hand 124 includes a holding mechanism so as to be able to hold a conveying object, which is a workpiece for the mobile robot 10. The mobile robot 10 is not limited to conveying the conveying object but instead can be employed for various purposes. The holding part 120 can hold various workpieces according to the purpose of the mobile robot 10. For example, a lever may be held to rotate the holding part 12 in order to perform an operation of opening a door.

Like the cart part 110, various sensors for knowing a workpiece and detecting posture are provided on the holding part 120. As these sensors, a gyro sensor 260 for detecting tilt of the arm 123, a pressure sensor 270 for detecting a holding pressure of the hand 124, and a rotary encoder 280 for detecting an amount of rotation of the arm 122 are provided. Similar sensors are provided on various parts as necessary. Further, like the sensors provided on the cart part 110, the sampling data output from each sensor is transmitted to the control unit 190.

Figure 2:
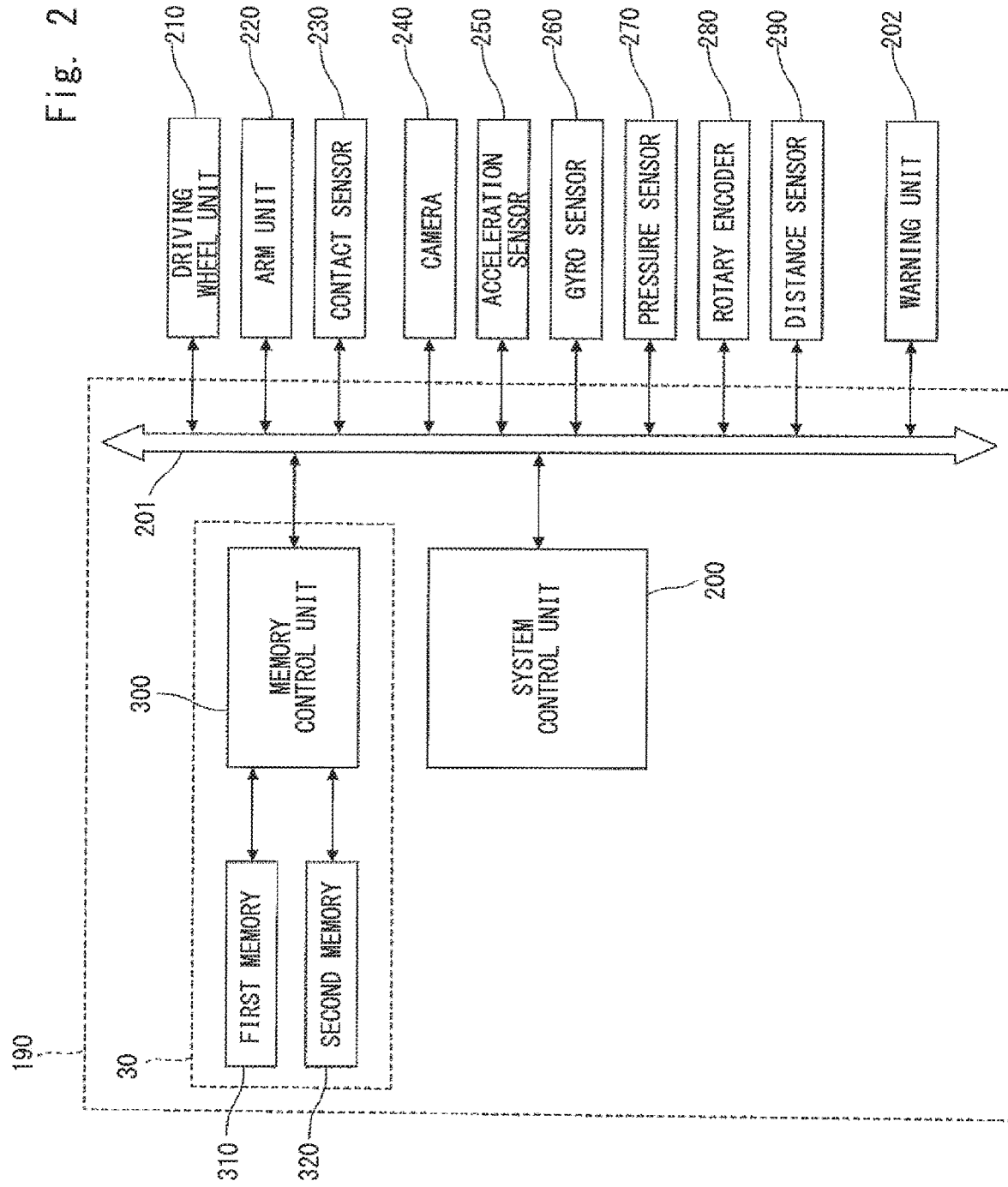
FIG. 2 is a control block diagram of the mobile robot.

FIG. 2 is a control block diagram of the mobile robot 10. The control unit 190 mainly includes a system control unit 200 that comprehensively controls the entire mobile robot 10, a storage device 30, and a bus line 201. The bus line 201 is connected to the system control unit 200, the storage device 30, various sensors, and various units. The bus line 201 functions as a communication path for the sampling data and instruction signals.

The system control unit 200 is, for example, a CPU. The system control unit 200 transmits and receives information such as commands, the sampling data and the like to and from a driving wheel unit 210, an arm unit 220, the sensors, a warning unit 202, and the storage device 30, whereby the system control unit 200 executes various calculation related to control of the mobile robot 10. The driving wheel unit 210 includes a driving circuit and a motor for driving the driving wheels 112 and is provided in the cart part 110. The system control unit 200 transmits a driving signal to the driving wheel unit 210 to thereby control rotation of the driving wheels 112. The arm unit 220 includes a driving circuit and a motor for driving the arms 121, 122, and 123 and the hand 124 and is provided in the holding part 120. The system control unit 200 transmits a driving signal to the arm unit 220 to control posture and holding of the holding part 120.

The contact sensors 230 are switches that become conductive, for example, by pressing contact. The cameras 240 each include, for example, a CMOS image sensor, an imaging lens, and an image processing unit for converting an image signal into frame image data. For example, one camera 240 is provided at each of the four corners of the cart part 110. The camera 240 may be provided on the hand 124 so that a holding object can be observed. The acceleration sensor 250 is a sensor that detects acceleration of the mobile robot 10. The acceleration sensor 250 may be provided on the hand 124 to hold the holding object safely.

The gyro sensor 260 may be provided on the base 111 in order to know the posture of the cart part 110 in addition to being provided on the arms 121, 122, and 123. The pressure sensor 270 is composed of, for example, a strain gauge. The rotary encoder 280 detects an amount of relative rotation of the arms 121, 122, and 123. The rotary encoder 280 is provided not only in the holding part 120 but is also provided in the cart part 110 for detecting an amount of rotation of the driving wheels 112. The distance sensor 290 is, for example, a laser rangefinder.

The sampling data output from these sensors is output to the bus line 201 in synchronization with the sampling periods of the respective sensors. That is, each sensor sequentially outputs the sampling data to the bus line 201 in accordance with its own sampling period. For example, if a frame rate is set to 30 fps, the cameras 240 output image data of 30 frames per second to the bus line 201.

The warning unit 202 includes, for example, a speaker and an LED. The warning unit 202 notifies the user that an abnormality has occurred by means of sound or light when the system control unit 200 outputs a warning signal. The warning unit 202 may include a communication unit such as a wireless LAN and may be configured to transmit a warning to a terminal the user is using.

The storage device 30 mainly includes a memory control unit 300, a first memory 310, and a second memory 320. In this embodiment, the first memory 310 and the second memory 320 are configured as separate memory chips. For example, the first memory 310 is an SRAM which is a volatile memory, and the second memory is a FLASH memory which is a non-volatile memory. A data writable speed of the first memory 310, which is the SRAM, is greater than the data writable speed of the second memory 320, which is the FLASH memory.

The memory control unit 300 controls reading and writing of data from and to the first memory 310 and the second memory 320. Specifically, as will be described later, the memory control unit 300 sequentially receives the sampling data of the respective sensors from the bus line 201 and writes it into the first memory 310. Further, the memory control unit 300 transfers the data from the first memory 310 to the second memory 320 in accordance with a command from the system control unit 200. Note that control programs for controlling the mobile robot 10 and the storage device 30, various parameter values, functions, lookup tables, and the like used for the control are stored in a part of a storage region of the second memory 320 or a non-volatile storage region (not shown). The system control unit 200 and the memory control unit 300 read these programs and execute each of the controls.

Figure 3:
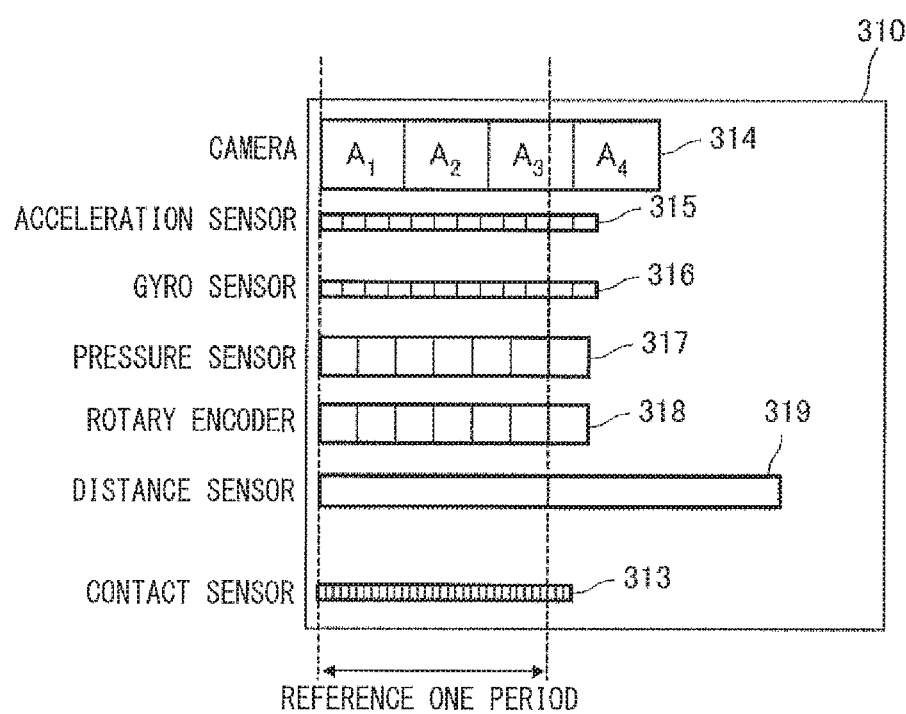
FIG. 3 is a conceptual diagram for describing a ring buffer set in a first memory.

FIG. 3 is a conceptual diagram for describing a ring buffer set in the first memory 310. The first memory 310 functions as a first storage region including a plurality of sensor regions. The sensor regions are provided for the plurality of sensors in the mobile robot 10, respectively. To each of the sensor regions, a storage capacity in which the sampling data for a plurality of periods is written are allocated. More specifically, the following sensor regions are provided. A ring buffer 314 which is a region for sequentially storing the sampling data of the cameras 240, a ring buffer 315 which is a region for sequentially storing the sampling data of the acceleration sensor 250, a ring buffer 316 which is a region for sequentially storing the sampling data of the gyro sensor 260, a ring buffer 317 which is a region for sequentially storing the sampling data of the pressure sensor 270, a ring buffer 318 which is a region for sequentially storing the sampling data of the rotary encoder 280, a ring buffer 319 which is a region for sequentially storing the sampling data of the distance sensor 290.

The memory control unit 300 writes the sampling data of the sensors into the respective ring buffers in a ring buffer format. In the ring buffer format, the oldest sampling data is overwritten with the latest sampling data, and the sampling data for a plurality of periods are continuously held. In FIG. 3, one sensor region is shown for one type of sensor. However, when two or more sensors of the same type are provided, the sensor region is extended according to the number of the sensors provided.

As described above, each of the ring buffers 314 to 319 has the storage capacity to write the sampling data for a plurality of periods. For example, the cameras 240 output image data of one frame in one period. The ring buffer 314 for the cameras 240 has the storage capacity to write the image data of four frames as a whole. In FIG. 3, the storage capacity per frame is conceptually represented by an area of one rectangle, and the ring buffer 314 is composed of four memory spaces $A_1$, $A_2$, $A_3$, and $A_4$. In a group of the sensors according to the present disclosure, it can be seen that the data capacity per sample is large for the cameras 240, and the data capacity per sample for the acceleration sensor 250 and the gyro sensor 260 is small.

The horizontal width of the rectangle, which is a memory space where the sampling data is stored, indicates the sampling period as the time required for one sample. That is, in the group of the sensors according to the present disclosure, it can be seen that the sampling period of the distance sensor 290 is the longest, and the sampling periods of the acceleration sensor 250 and the gyro sensor 260 are relatively short. In the present disclosure, the sampling period of the distance sensor 290, which has the longest sampling period, is defined as reference one period.

The contact sensor 230 is not a kind of sensor that obtains a physical quantity of an observing object that changes by the minute in a numerical value. However, the memory control unit 300 can treat the contact sensor 230 in the same way as the other sensors by setting, for example, a contact state to 1 and a non-contact state to 0 and outputting either of the values at fixed periods as the sampling data. In the present disclosure, a ring buffer is configured for a sensor that outputs the sampling data when it is turned on or off in the same way as the ring buffers of the sensors that obtain physical quantities of an observing object in numerical values. Therefore, in the first memory 310, a ring buffer 313, which is a region for sequentially storing the sampling data of the contact sensor 230, is also configured as the sensor region.

In the present disclosure, the capacity necessary for storing the sampling data for two periods is provided for the storage capacity allocated to the ring buffer 319 for the distance sensor 290. Further, the capacity necessary for storing the sampling data for a period of one or more to two or less times the reference one period is provided for the storage capacity allocated to each of the ring buffers 313 to 318 of the sensors other than the distance sensor 290. For example, the ring buffer 314 for the cameras 240 has a capacity to store the sampling data for a period of about 1.5 times the reference one period. With such a configuration, in parallel to an operation of reading one piece of the sampling data, an operation of writing other pieces of the sampling data can be carried out in any of the ring buffers. Thus, a capacity of the first memory 310 can be greatly reduced.

Figure 4:
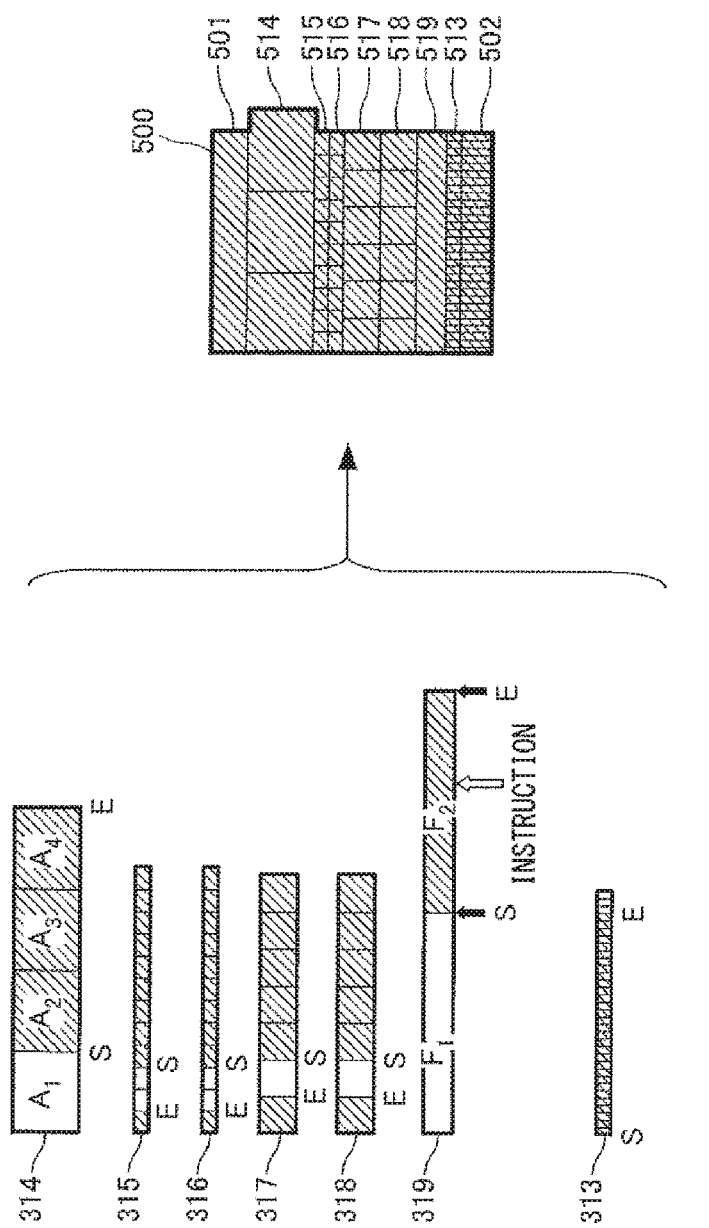
FIG. 4 is a conceptual diagram for describing generation of a data set.

In the present disclosure, a data set 500 is generated at a predetermined timing. The data set 500 is obtained by reading, from the ring buffers 313 to 319, respectively, the sampling data of the distance sensor 290 for reference one period and the sampling data of other sensors corresponding to the period during which the sampling data of the distance sensor 290 is generated and integrating these pieces of sampling data. FIG. 4 is a conceptual diagram for describing the generation of the data set 500.

The memory control unit 300 generates the data set 500 with reference to the sampling period of the distance sensor 290 having the longest sampling period.

For example, as shown in FIG. 4, it is assumed that the ring buffer 319 for the distance sensor 290 is composed of memory spaces $F_1$ and $F_2$ for two periods. At this time, if a generation instruction for the data set is issued while obtaining the sampling data in $F_2$ (at a timing indicated by the open arrow in FIG. 4), the reference one period corresponding to the sampling data in $F_2$ starts at the timing S indicated by the filled arrow and ends at the timing E indicated by another filled arrow.

The memory regions where the sampling data generated by the sensors other than the distance sensor 290 in the period when the sampling data in $F_2$ is generated are indicated by, as an example, hatched regions between S and E for the respective buffers. For example, in the case of the ring buffer 314 for the cameras 240, the corresponding memory region is memory spaces $A_2$, $A_3$, and $A_4$. However, since the sampling periods of the respective sensors differ from each other (the sampling periods of the respective sensors could be the same), the hatched regions dynamically change according to the timing when the generation instruction is issued.

The memory control unit 300 generates the data set 500 by integrating the sampling data in the hatched regions in the respective ring buffers. That is, the data set 500 includes sampling data 514 retrieved from the ring buffer 314 for the cameras 240, sampling data 515 retrieved from the ring buffer 315 for the acceleration sensor 250, sampling data 516 retrieved from the ring buffer 316 for the gyro sensor 260, sampling data 517 retrieved from the ring buffer 317 for the pressure sensor 270, sampling data 518 retrieved from the ring buffer 318 for the rotary encoder 280, sampling data 519 retrieved from the ring buffer 319 for the distance sensor 290, and sampling data 513 retrieved from the ring buffer 313 for the contact sensor 230.

Further, the data set 500 includes tag data 501 and diagnostic data 502. The tag data describes various kinds of information on attributes of the data set 500. The tag data includes, for example, time information on a time when the data set is generated. The time information may be the information on a time when the generation instruction is issued or a time of the starting time S for each sampling data. Further, the tag data includes ID information indicating a position of the mobile robot 10 where the sensor, the sampling data thereof being included in the corresponding data set 500, is mounted.

The diagnostic data 502 includes flags indicating whether or not voltage values at a plurality of predetermined positions in the control circuit are normal or abnormal recorded over corresponding periods. Such tag data 501 and diagnostic data 502 are effective in terms of time management and knowing the situations when the data set 500 is used for control later or used afterwards for analyzing movements of the mobile robot 10.

Figure 5:
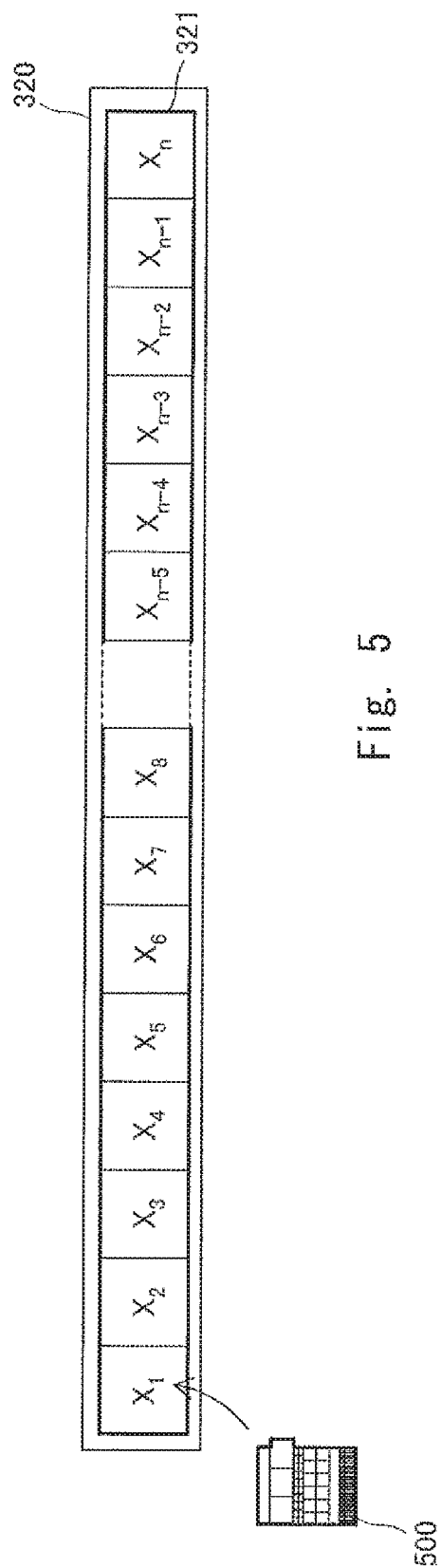
FIG. 5 is a conceptual diagram for describing a ring buffer set in a second memory.

FIG. 5 is a conceptual diagram illustrating a ring buffer 321 set in the second memory 320. The ring buffer 321 is a second storage region for writing the data set 500. The ring buffer 321 can store n data sets 500 each composed of n memory spaces $X_1$ to $X_n$ at an initial stage. The memory control unit 300 writes the data set 500 into the ring buffer 321 in a ring buffer format. In the ring buffer format, the oldest data set is overwritten with the latest data set, and a plurality of data sets (n data sets in the initial stage) are continuously held.

FIGS. 6A, 6B, 6C and 6D are conceptual diagrams for describing the movement of the data set to be left as log information. The data set to be left as the log information is moved from the second storage region, which is the ring buffer 321, to a third storage region, which is not overwritten until a reset signal is received. In this embodiment, the third storage region is reserved by sequentially changing a part of the ring buffer 321 used as the second storage region in the second memory 320 to a non-volatile buffer 322, which is used as the third storage region. The memory region shown in FIGS. 6A, 6B, 6C and 6D are described as being composed of ten memory spaces $X_1$ to $X_{10}$ and having a storage capacity capable of storing ten data sets. Further, in this case, the number of data sets to be moved to the third storage region when the memory control unit 300 receives a saving trigger as a saving signal shall be three (N=3). The number of data sets to be moved from the second storage region to the third storage region when the saving trigger is received is determined in advance.

Figure 6A:
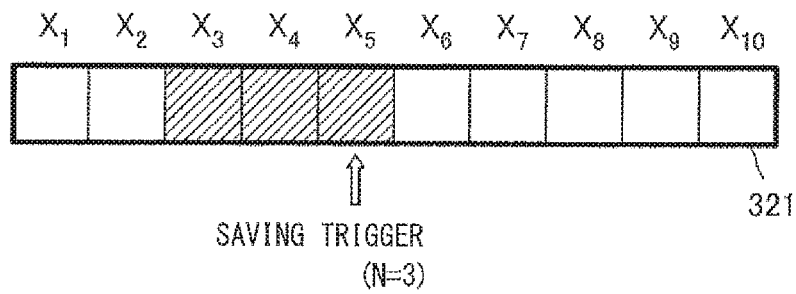
FIG. 6A is a conceptual diagram for describing a movement of a data set to be left as log information.

FIG. 6A shows a state where all the memory spaces are used as the ring buffer 314 at an initial stage. For example, if the saving trigger is received when the latest data set is stored in $X_5$, the memory control unit 300 determines three data sets stored in $X_5$ and $X_4$ and $X_3$, which are sequentially counted backward from $X_5$, as data sets to be moved to the third storage region.

Figure 6B:
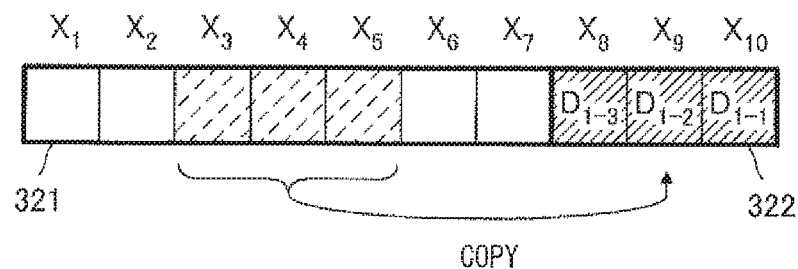
FIG. 6B is a conceptual diagram for describing a movement of a data set to be left as log information.

FIG. 6B shows a state where memory spaces for the three data sets are reserved as the non-volatile buffer 322. The memory control unit 300 changes the lower three memory spaces $X_8$ to $X_{10}$ used as the ring buffer 321 to the non-volatile buffer 322 to be used as the third storage region. That is, the storage region of the ring buffer 321 is changed to seven memory spaces $X_1$ to $X_7$. Then, the data sets in $X_3$ to $X_5$, which are determined to be moved in FIG. 6A, are copied to $X_8$ to $X_{10}$. The moved data sets in $X_8$ to $X_{10}$ are denoted by $D_{1-1}$, $D_{1-2}$, and $D_{1-3}$, respectively, indicating the data sets moved by a first saving trigger. By this operation, the data sets $D_{1-1}$, $D_{1-2}$, and $D_{1-3}$ are saved without being overwritten until the reset signal is received. Moreover, since the second memory 320 is a non-volatile memory, these data sets are left even when power is not supplied to the storage device 30.

Figure 6C:
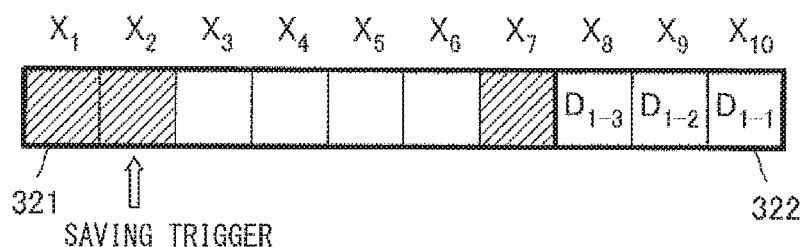
FIG. 6C is a conceptual diagram for describing a movement of a data set to be left as log information.

FIG. 6C shows a state where the memory spaces $X_1$ to $X_7$ are used as the ring buffer 314 after the operation of FIG. 6B. For example, if the saving trigger is received when the latest data set is stored in $X_2$, the memory control unit 300 determines three data sets stored in $X_2$ and $X_1$ and $X_7$, which are sequentially traced backward from $X_2$, as data sets to be moved to the third storage region.

Figure 6D:
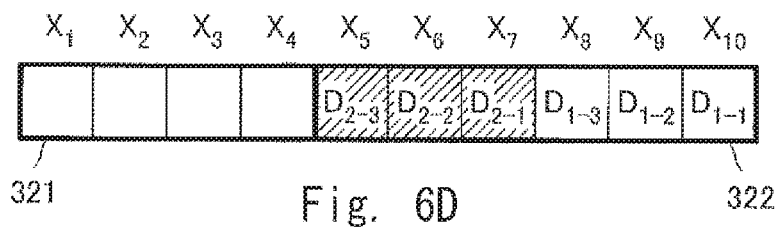
FIG. 6D is a conceptual diagram for describing a movement of a data set to be left as log information.

FIG. 6D shows a state where the memory spaces corresponding to another three data sets is reserved as the non-volatile buffer 322 after the state of FIG. 6C. The memory control unit 300 changes the lower three memory spaces $X_5$ to $X_7$ used as the ring buffer 321 to the non-volatile buffer 322 to be used as the third storage region. That is, the storage region of the ring buffer 321 is changed to four memory spaces $X_1$ to $X_4$. Then, the data sets in $X_2$, $X_1$, and $X_7$, which are determined to be moved in FIG. 6C and are denoted by $D_{2-1}$, $D_{2-2}$, and $D_{2-3}$, are copied to $X_5$ to $X_7$ by a second saving trigger. The moved data sets in $X_5$ to $X_7$ are denoted by $D_{2-1}$, $D_{2-2}$, and $D_{2-3}$, respectively, indicating the data sets moved by a second saving trigger. By this operation, the data sets $D_{2-1}$, $D_{2-2}$, and $D_{2-3}$ are saved without being overwritten until the reset signal is received In this way, when a part of the area used as the ring buffer 321 is changed to the non-volatile buffer 322 every time the saving trigger is received, if the storage capacity of the ring buffer 321 falls below a capacity necessary for storing N data sets, the memory control unit 300 outputs a warning signal. Specifically, the memory control unit 300 transmits the warning signal to the system control unit 200, and when the system control unit 200 receives the warning signal, it causes the warning unit 202 to generate a sound or light to notify the user that he or she will no longer be able to obtain the log. The user then can recognize that he or she will no longer be able to obtain the log and, for example, stops the mobile robot 10 or has it transition to a safe mode.

The number N of the data sets to be moved to the third storage region when the memory control unit 300 receives the saving trigger may not be three. When using the data set as a log, the necessary number N may be adjusted and determined in advance. Further, the number N may be changed according to the situations of the mobile robot 10. In this case, information that specifies the number N may be included in the saving signal used as the saving trigger. The memory control unit 300 moves the specified number N of data sets to the third storage region according to the saving trigger.

Moreover, the latest data set when the saving trigger is received may not be used as the reference of the data set to be moved and instead another data set may be used as a reference of the data set to be moved. As will be described later, the saving trigger is generated when a predetermined event occurs in the mobile robot 10. However, the information necessary as the log is not necessarily the information at the time of the occurrence of the event. The information necessary as the log differs according to the nature of the event and a timing when the output of the sensor is obtained. In such a case, the saving signal, which is the saving trigger, may include information specifying the data set to be used as the reference. For example, if the number C of data sets to be counted backward is specified, the memory control unit 300 moves N data sets to the third storage region with reference to the data set C before the latest data set. By specifying the number C in this way, it is possible to expand the range of the data sets to be used as the log and to improve the reliability accuracy.

Figure 7:
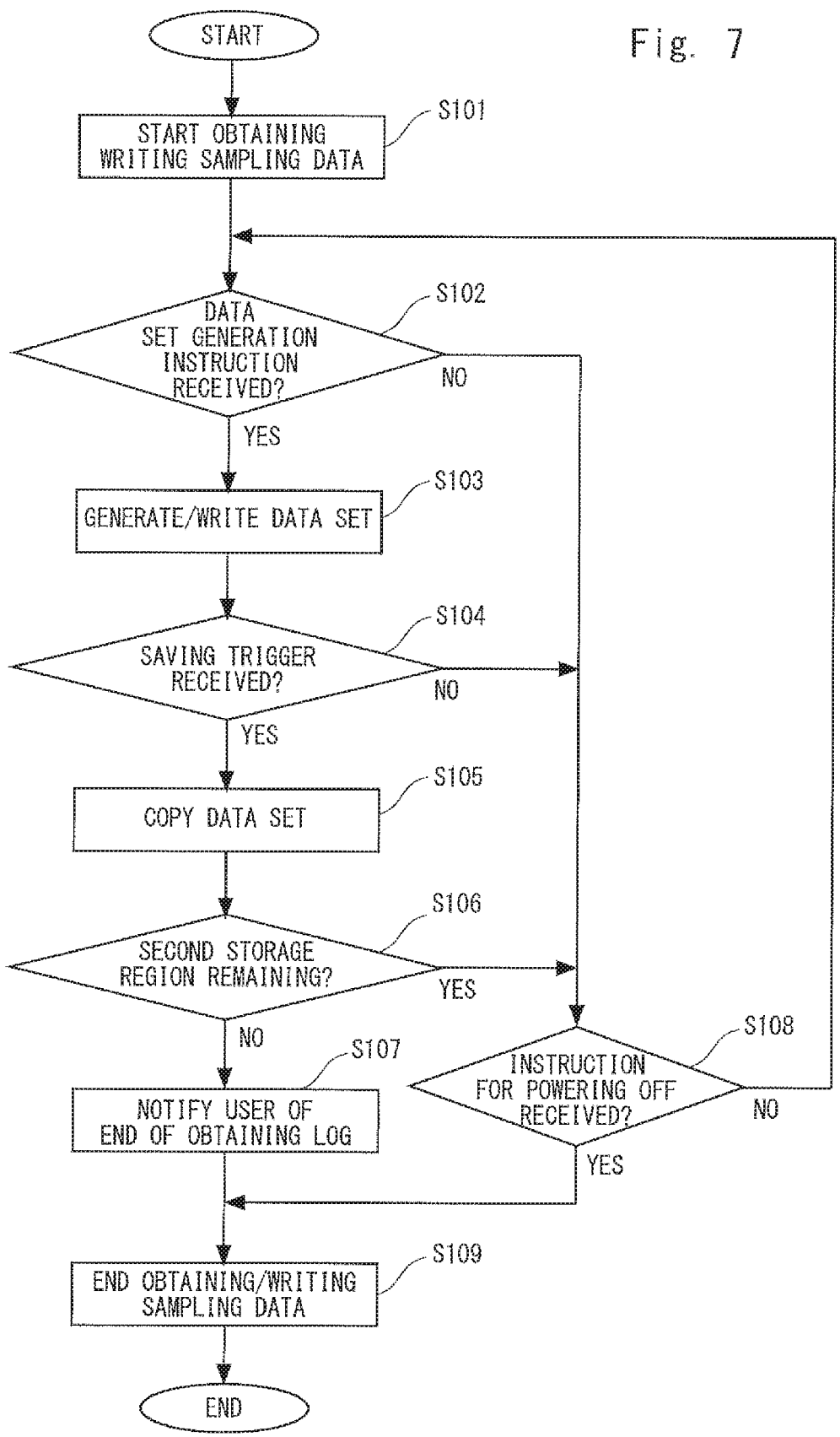
FIG. 7 is a flowchart showing a control flow of a storage device.

FIG. 7 is a flowchart showing a control flow of the storage device 30. The flow starts when the power of the mobile robot 10 is turned on, and the sampling of each sensor is started.

In Step S101, the memory control unit 300 starts obtaining the sampling data and writing the obtained sampling data into the first memory 310. As described above, the memory control unit 300 sequentially obtains the sampling data from each sensor through the bus line 201 in accordance with the sampling period of the corresponding sensor. Then, the respective pieces of the sampling data are written into the corresponding ring buffers 313 to 319 in the ring buffer format. These operations are executed in parallel for the respective sensors continuously until the process proceeds to the Step S109.

In Step S102, the memory control unit 300 checks as to whether or not the generation instruction to generate the data set 500 has been received. If the generation instruction has not been received, the process proceeds to Step S108, whereas if the generation instruction has been received, the process proceeds to Step S103. In this embodiment, the generation instruction is issued by the system control unit 200. The system control unit 200 regularly issues the generation instruction in synchronization with, for example, a clock signal. The system control unit 200 can change the period of issuing the generation instruction. For example, when the mobile robot 10 is moving at a high speed equal to or greater than a predetermined speed, the generation instruction is issued in short periods. When the mobile robot 10 is moving at a low speed less than the predetermined speed, the generation instruction is issued in long periods.

Moreover, the memory control unit 300 may be configured to periodically generate a generation instruction signal, and the system control unit 200 may be configured to transmit an instruction signal to the memory control unit 300 to change the period. The memory control unit 300 changes the period of issuing the generation instruction signal in accordance with the instruction signal. With such a configuration, the memory region can be effectively utilized because the data set 500 can be generated according to the situations of the mobile robot 10.

In Step S103, the memory control unit 300 generates the data set 500 and writes the data set 500 into the ring buffer 321, which is the second storage region of the second memory 320, in the ring buffer format. Specifically, the data set 500 is generated as described with reference to FIG. 4. Further, the data set 500 is written as described with reference to FIGS. 5 and 6. Then, the process proceeds to Step S104 where it is checked as to whether or not the memory control unit 300 has received the saving trigger, which is the instruction for moving the data set 500 to the third storage region that is a non-volatile memory. If the saving trigger has not been received, the process proceeds to Step S108. If the saving trigger has been received, the process proceeds to Step S105.

In Step S105, the memory control unit 300 moves the data sets to be moved by copying them to the non-volatile buffer 322, which is the third storage region. Specifically, the third storage region is sequentially extended as described with reference to FIG. 6D. Then, the process proceeds to Step S106 where the memory control unit 300 evaluates as to whether or not the memory capacity for storing N data sets remains in the ring buffer 321, which is the second storage region. If there is the memory capacity for storing N data sets remaining in the ring buffer 321, the process proceeds to Step S108. If not, the process proceeds to Step S107.

In Step S107, the memory control unit 300 transmits the warning signal to the system control unit 200. The system control unit 200 notifies the user of the end of obtaining the log through the warning unit 202. After that, the process proceeds to Step S109 where the memory control unit 300 ends the obtaining and the writing of the sampling data continuously executed from Step S101 and then ends the series of the processing.

When the process proceeds to Step S108 from Step S102 or Step S106, in Step S108, the memory control unit 300 checks as to whether or not there has been an instruction to power off the mobile robot 10 through the system control unit 200. If there has been no such instruction, the process returns to Step S102. If there has been such an instruction, the process proceeds to Step S109. When the process proceeds to Step S109, the obtaining and the writing of the sampling data are ended as described above, and the series of the processing is ended.

Next, other embodiments of the present disclosure will be described. It should be noted that device configurations and processing procedures not mentioned in particular are the same as those in the above-described embodiment. Thus, descriptions thereof will be omitted.

Figure 8:
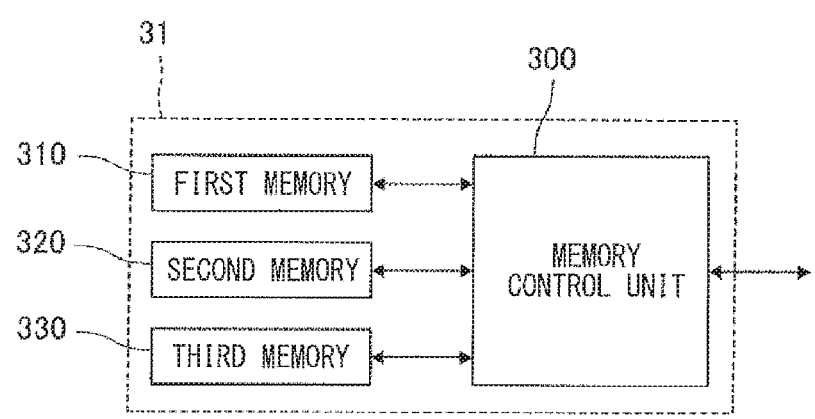
FIG. 8 is a block diagram of a storage device according to other embodiments.

FIG. 8 is a block diagram of a storage device 31 according to the other embodiments. Unlike the above-described storage device 30, the storage device 31 further includes a third memory 330. The third memory 330 is, for example, a FLASH memory which is a non-volatile memory. The third memory 330 includes a non-volatile buffer 322 as the third storage region. Therefore, the storage region as the non-volatile buffer 322 is not provided in the second memory 320 and instead the second memory 320 is used as a dedicated region for the ring buffer 321.

With such a configuration, the second memory 320 may also be a volatile memory, and the first storage region as the first memory 310 and the second storage region as the second memory 320 may be arranged in one memory chip. If the first and second memory regions are mounted on one memory chip in this way, the memory can be easily implemented, and the footprint of the memory can be reduced.

Figure 9A:
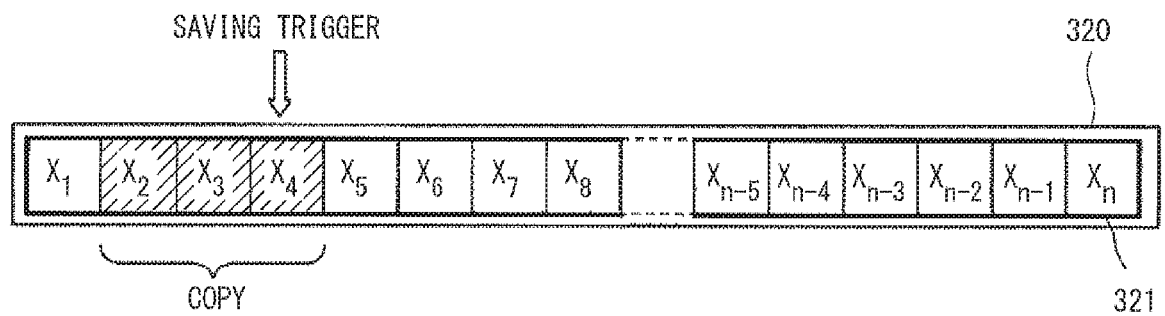
FIG. 9A is a conceptual diagram for describing a movement of a data set to be left as log information.
Figure 9B:
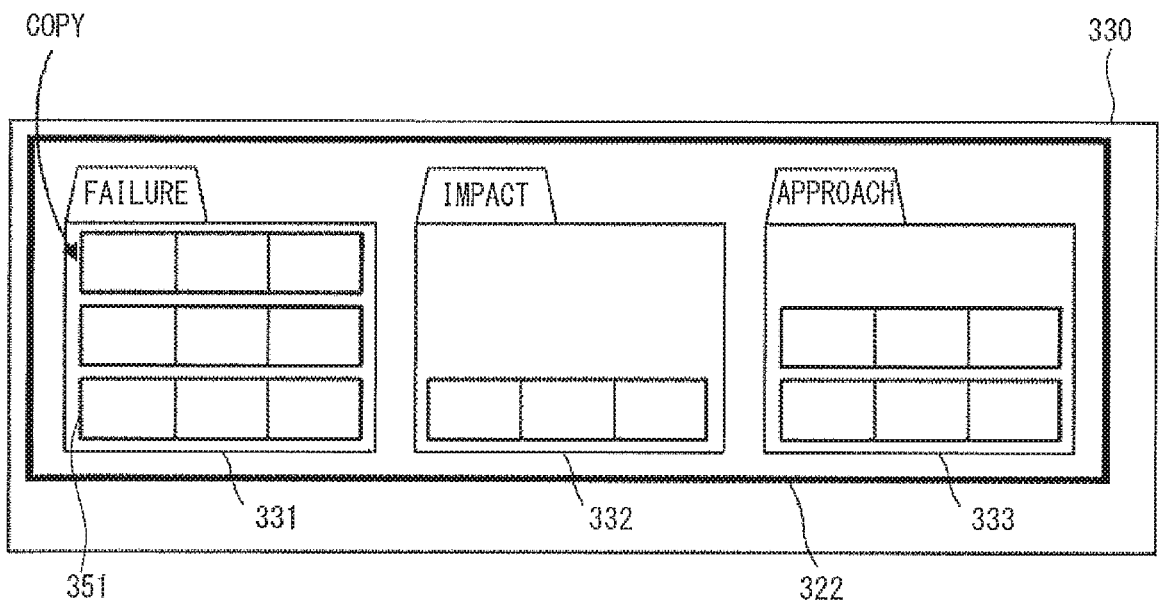
FIG. 9B is a conceptual diagram for describing a movement of a data set to be left as log information.

FIGS. 9A and 9B are conceptual diagrams for describing the movement of the data set to be left as the log information by the storage device 31. FIG. 9A shows a state of the ring buffer 321 in the second memory 320. In the ring buffer 321, memory spaces $X_1$ to $X_n$ for storing n data sets as the second storage region are reserved, so that memory spaces will not be reduced even if the saving trigger is issued. For example, when the saving trigger is issued at $X_4$, three data sets stored in $X_2$ to $X_4$ are moved if N=3. However, the memory spaces of $X_{n-1}$ to $X_n$ remain to be the ring buffer 321.

FIG. 9B shows a state of the non-volatile buffer 322 in the third memory 330. As in the above-described embodiment, the moved data sets may be stored in order. If the dedicated non-volatile buffer 322 can be reserved, the memory space can be used more flexibly. In the example shown in FIG. 9B, a folder is provided in the non-volatile buffer 322 for each event that can occur in the mobile robot 10. For example, folders 331, 332, and 333 are provided. The folder 331 is for storing data sets generated in the event of a failure of the mobile robot 10, the folder 332 is for storing data sets generated at the time of an occurrence of an impact, and the folder 333 is for storing data sets generated when the mobile robot 10 is approaching an obstacle.

When the memory control unit 300 receives the saving trigger that is issued in response to the event, it stores the target data sets collectively as a file 351 in the corresponding folder. If the data sets are collectively stored in this way, it is more convenient when the data set 500 is used for control later or used afterwards for analyzing movements of the mobile robot 10.

Next, a control flow of the system control unit 200 during the operation of the mobile robot 10 will be described. FIG. 10 is a flowchart showing the control flow of the mobile robot 10. The system control unit 200 drives the driving wheels 112 or drives the holding part 120 to convey a conveying object according to a given task. However, in the following descriptions, processing related to the storage device 30 will be focused on. In this example, although the storage device 30 is assumed to be mounted on the mobile robot 10, the following operation will be mostly the same as the case when the storage device 31 is mounted on the mobile robot 10. Moreover, the processing flow of the memory control unit 300 described with reference to FIG. 7 is executed in parallel and in association with the processing flow of FIG. 10.

The flow starts when the power of the mobile robot 10 is turned on, and the sampling of each sensor is started. In Step S201, the system control unit 200 checks as to whether or not the mobile robot 10 is moving. If the mobile robot 10 is moving, the process proceeds to Step S202 where the number N of the data sets 500 to be copied from the ring buffer 321 to the non-volatile buffer 322 by one saving trigger is set to a number $N_m$, which has been determined in advance for use while the mobile robot 10 is moving. Further, the number C indicating how many data set to count backward from the latest data set to be used as the reference data set is set to a number $C_m$, which has been determined in advance for use while the mobile robot 10 is moving. The numbers $N_m$ and $C_m$ are determined in advance based on an experiment and the like as the optimum numbers for log analysis and the like for use while the mobile robot 10 is moving.

The process proceeds to Step S203 where the system control unit 200 evaluates as to whether or not an event has occurred. The event is, for example, "failure", "impact", "approach", and the like. Especially events that are assumed to require log analysis afterwards as troubles in the mobile robot 10 could be regarded as the events. In the case of a "failure", for example, if the output of the acceleration sensor 250 stays zero even when the system control unit 200 transmits the driving signal to the driving wheel unit 210, the system control unit 200 evaluates that the event of the "failure" has occurred. That is, when there is an inconsistency equal to or greater than a threshold between the driving signal being transmitted and the relevant sensor output, or when the system control unit 200 obtains the sensor output indicating that the mobile robot 10 is not safe due to the surrounding environment, the system control unit 200 evaluates that the event has occurred. In particular, while the mobile robot 10 is moving, when any one of the sensors detects a predetermined situation related to the movement, such as when the mobile robot 10 is about to ride on a step, the system control unit 200 may evaluate that the event has occurred. This is because when the mobile robot 10 is about to ride on a step, it may often need to analyze the log as the robot may undergo an impact or select a route different from a planned route.

If the system control unit 200 evaluates that the event has occurred, it transmits the saving trigger to the memory control unit 300 in Step S204, and the process proceeds to Step S205. If the system control unit 200 evaluates that the event has not occurred, the process skips Step S204 and proceeds to Step S205. If the saving trigger in transmitted in Step S204, the information on $N_m$ and $C_m$ may be attached to the saving trigger.

In Step S205, the system control unit 200 checks as to whether or not the mobile robot 10 has stopped. If the system control unit 200 evaluates that the mobile robot 10 has not stopped, the process returns to Step S203. If the system control unit 200 evaluates that the mobile robot 10 has stopped, the process proceeds to Step S206 where the system control unit 200 checks as to whether or not there has been an instruction to power off the mobile robot 10. If there has been no instruction to power off the mobile robot 10, the process returns to Step S201, whereas if there has been an instruction to power off the mobile robot 10, a series of the processing is ended.

If the system control unit 200 confirms that the mobile robot 10 is not moving in Step S201, the process proceeds to Step S207 where the system control unit 200 checks as to whether or not the arms 121 to 123 and the hand 124 are in operation. If they are in operation, the process proceeds to Step S208 where the system control unit 200 sets the number N of data sets 500 to be copied from the ring buffer 321 to the non-volatile buffer 322 by one saving trigger to a number $N_a$, which has been determined in advance for use during operation of the arms and the like. Further, the number C indicating how many data set to count backward from the latest data set to be used as the reference data set is set to a number $C_a$, which has been determined in advance for use during operation of the arms and the like. The numbers $N_a$ and $C_a$ are determined in advance based on an experiment or the like as the optimum numbers for log analysis and the like of the arms and the like during their operations.

The process proceeds to Step S209 where the system control unit 200 evaluates as to whether or not an event has occurred. The events to be evaluated are the same as those of Step S203. In particular, when the arms and the like are in operation, it may be determined that an event has occurred when any one of the sensors detects a predetermined situation related to the operation of the arms and the like.

If the system control unit 200 evaluates that an event has occurred, it transmits the saving trigger to the memory control unit 300 in Step S210, and the process proceeds to Step S211. If the system control unit 200 evaluates that an event has not occurred, the process skips Step S209 and proceeds to Step S211. If the saving trigger in transmitted in Step S210, the information on $N_a$ and $C_a$ may be attached to the saving trigger.

In Step S211, the system control unit 200 checks as to whether or not the operation of the arms and the like has been stopped. If the system control unit 200 evaluates that the mobile robot 10 has not stopped, the process returns to Step S209. If the system control unit 200 evaluates that the mobile robot 10 has stopped, the process proceeds to Step S206 where the system control unit 200 checks as to whether or not there has been an instruction to power off the mobile robot 10. If there has been no instruction to power off the mobile robot 10, the process returns to Step S201, whereas if there has been an instruction to power off the mobile robot 10, a series of the processing is ended.

In Step S207, if the system control unit 200 confirms that the arms and the like are not in operation, the process proceeds to Step S212 and sets the number N of the data sets 500 to be copied from the ring buffer 321 to the non-volatile buffer 322 by one saving trigger to a number $N_s$, which has been determined in advance for use while the operation is stopped. Further, the number C indicating how many data set to count backward from the latest data set to be used as the reference data set is set to a predetermined number $C_s$, which has been determined in advance for use while the operation is stopped. The numbers $N_s$ and $C_s$ are determined in advance based on an experiment or the like as the optimum numbers for log analysis and the like of the arms and the like while the operation is stopped.

The process proceeds to Step S213 where the system control unit 200 evaluates as to whether or not the event has occurred. The events to be evaluated are the same as those of Step S203. In particular, while the operation of the mobile robot is stopped, the system control unit 200 may evaluate that the event has occurred when any one of the sensors detects a predetermined situation related to the operation stop.

If the system control unit 200 evaluates that an event has occurred, it transmits the saving trigger to the memory control unit 300 in Step S214, and the process proceeds to Step S206. If the system control unit 200 evaluates that an event has not occurred, the process skips Step S214 and proceeds to Step S206. If the saving trigger in transmitted in Step S214, the information on $N_s$ and $C_s$ may be attached to the saving trigger.

When the process proceeds to Step S206, the system control unit 200 checks as to whether or not there has been an instruction to power off the mobile robot 10. If there has been no instruction to power off the mobile robot 10, the process returns to Step S201, whereas if there has been an instruction to power off the mobile robot 10, a series of the processing is ended. As described above, the system control unit 200 may appropriately provide the generation instruction for generating a data set to the memory control unit 300.

In the above-described present disclosure, the case where the storage device 30 or 31 is mounted on the mobile robot 10 has been described. However, the storage devices 30 or 31 having the above-described configuration may be mounted on a device other than a mobile robot. The storage device 30 or 31 may be mounted on a device including a plurality of sensors of different types such as an automatic driving vehicle that autonomously moves by using a plurality of sensors including a sensor using a sound such as an ultrasonic wave, a sensor for obtaining a distance such as a laser sensor, a camera, and the like. In this case, the storage device 30 or 31 may be used as a device for analyzing a log afterwards.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A storage device for storing sampling data of a plurality of sensors of different types, the storage device comprising:
   a first memory including a plurality of ring buffers, corresponding to a plurality of sensors, configured to store sampling data of the plurality of sensors;
   a second memory including a ring buffer configured to store a data set generated from the sampling data; and
   a processor configured to:
      write the sampling data of the plurality of sensors into the plurality of ring buffers of the first memory in a ring buffer format;
      generate the data set at a predetermined timing by reading, from the plurality of ring buffers of the first memory, the sampling data, wherein the data set has a size based on a sampling period of a sensor having a longest sampling period among the plurality of sensors for one period, wherein the data set includes sampling data of other sensors for a period corresponding to the period in which the sampling data of the sensor for the one period is generated, and wherein the data set integrates the sampling data of the sensor having the longest sampling period with the sampling data of the other sensors; and
      write the data set into the ring buffer of the second memory in the ring buffer format,
      wherein, in the first memory, a storage capacity allocated to each of the ring buffers of the sensors other than the sensor having the longest sampling period among the plurality of sensors is a capacity necessary for storing the sampling data for a period of two times the one period of the sensor having the longest sampling period.

2. The storage device according to claim 1, wherein
   the processor is configured to include tag information in the data set, and
   the tag information includes time information on a time of when the data set was generated.

3. The storage device according to claim 1, wherein when an instruction signal is received from outside, the processor is configured to generate the data set and write the data set into the ring buffer of the second memory.

4. The storage device according to claim 1, wherein the processor is configured to change a period at which the data set is generated and written into the ring buffer of the second memory in accordance with an instruction signal received from outside.

5. The storage device according to claim 1, wherein the first memory and the second memory are contained in one memory chip.

6. The storage device according to claim 1, further comprising:
   a first memory chip including the first memory; and
   a second memory chip including the second memory, wherein
      the second memory chip is different from the first memory chip, and
      a data writable speed of the first memory chip is greater than a data writable speed of the second memory chip.

7. The storage device according to claim 1, wherein the second memory includes a non-volatile buffer that is not overwritten until a reset signal is received,
   wherein when a saving signal is received from outside, the processor is configured to copy, from the ring buffer and to the non-volatile buffer, data sets, and
   wherein a number of the data sets that are copied is determined in advance, from among a plurality of the data sets stored in the ring buffer of the second memory.

8. The storage device according to claim 7, wherein the processor is configured change a part of the ring buffer of the second memory to the non-volatile buffer every time the processor receives the saving signal.

9. The storage device according to claim 8, wherein the processor is configured to output a warning signal when a storage capacity of the second memory falls below a capacity for storing the number of the data sets.

10. The storage device according to claim 7, wherein the processor is configured to change at least the number of the data sets to be copied to the non-volatile buffer according to the saving signal.

11. A mobile robot on which the plurality of sensors and the storage device according to claim 7 are mounted, the mobile robot comprising a transmission interface, wherein the processor is configured to cause the transmission interface to transmit the saving signal to the storage device when any one of the plurality of sensors detects a predetermined situation related to movement.

12. The mobile robot according to claim 11, wherein the predetermined situation related to the movement includes a situation where a step is present in a traveling direction.

13. A storage method for storing sampling data of a plurality of sensors of different types into a storage device, the storage method comprising:
   writing the sampling data into a plurality of ring buffers, corresponding to the plurality of sensors, of a first memory in a ring buffer format;
   generating a data set at a predetermined timing; and
   writing the data set into a ring buffer of a second memory in the ring buffer format, wherein:
   the data set is generated by reading, from the plurality of ring buffers of the first memory, the sampling data,
   the data set has a size based on a sampling period of a sensor having a longest sampling period among the plurality of sensors for one period,
   the data set includes sampling data of other sensors for a period corresponding to the period in which sampling data of the sensor for the one period is generated and integrates the sampling data of the sensor having the longest sampling period with the sampling data of the other sensors, and
   in the first memory, a storage capacity allocated to each of the ring buffers of the sensors other than the sensor having the longest sampling period among the plurality of sensors is a capacity necessary for storing the sampling data for a period of two times the one period of the sensor having the longest sampling period.

14. A non-transitory computer readable medium storing a storage program for storing sampling data of a plurality of sensors of different types into a storage device, the storage program, when executed, causing a computer to:
   write sampling data of the plurality of sensors into a plurality of ring buffers, corresponding to the plurality of sensors, of a first memory in a ring buffer format;
   generate a data set at a predetermined timing; and
   write the data set into a ring buffer of a second memory in the ring buffer format, wherein:
   the data set is generated by reading, from the plurality of ring buffers of the first memory, the sampling data,
   the data set has a size based on a sampling period of a sensor having a longest sampling period among the plurality of sensors for one period,
   the data set includes sampling data of other sensors for a period corresponding to the period in which sampling data of the sensor for the one period is generated and integrates the sampling data of the sensor having the longest sampling period with the sampling data of the other sensors, and
   in the first memory, a storage capacity allocated to each of the ring buffers of the sensors other than the sensor having the longest sampling period among the plurality of sensors is a capacity necessary for storing the sampling data for a period of two times the one period of the sensor having the longest sampling period.

* * * * *